United States Patent
Stalker et al.

(10) Patent No.: US 8,394,459 B2
(45) Date of Patent: Mar. 12, 2013

(54) PRE-CONVERSION COATING COMPOSITION

(75) Inventors: Jeffrey L. Stalker, Wexford, PA (US); Shan Cheng, Sewickley, PA (US); Alan J. Kaylo, Glenshaw, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/422,460

(22) Filed: Mar. 16, 2012

(65) Prior Publication Data

US 2012/0171380 A1    Jul. 5, 2012

Related U.S. Application Data

(62) Division of application No. 12/485,539, filed on Jun. 16, 2009.

(51) Int. Cl.
    *B05D 3/00*      (2006.01)
(52) U.S. Cl. .................................... 427/327; 427/402
(58) Field of Classification Search ............ 427/327–330
See application file for complete search history.

(56) References Cited

U.S. PATENT DOCUMENTS

| | | | | |
|---|---|---|---|---|
| 5,328,526 | A | * | 7/1994 | Jo et al. .................... 148/260 |
| 6,183,570 | B1 | * | 2/2001 | Kawaguchi et al. ......... 148/243 |
| 6,361,623 | B1 | | 3/2002 | Ishikura et al. |
| 6,723,178 | B1 | * | 4/2004 | Bannai et al. ................ 148/253 |
| 2003/0230364 | A1 | * | 12/2003 | Greene et al. ............... 148/256 |
| 2004/0255819 | A1 | | 12/2004 | Sinko |
| 2008/0000383 | A1 | | 1/2008 | Nagai et al. |

OTHER PUBLICATIONS

Narayanan, Sankara. Surface Pretreatment by Phosphate Conversion Coatings—A Review. Rev. Adv. Mater. Sci. 9 (2005) 130-177.*

* cited by examiner

*Primary Examiner* — David Turocy
(74) *Attorney, Agent, or Firm* — Alicia M. Passerin

(57) ABSTRACT

The present invention is directed to a coating composition comprising (i) a corrosion inhibitor and the (ii) reaction product of a calcium compound with an acid compound. The coating composition is deposited onto a substrate prior to the application of a pre-treatment coating composition (conversion coating) onto the substrate. The present invention is also directed to a substrate that comprises a coating system that comprises such a coating composition.

15 Claims, No Drawings

PRE-CONVERSION COATING COMPOSITION

CROSS-REFERENCE TO RELATED APPLICATIONS

This is a divisional of U.S. patent application Ser. No. 12/485,539, filed Jun. 16, 2009, entitled "Pre-Conversion Coating Composition".

FIELD OF THE INVENTION

The present invention relates to a coating composition that is applied onto a substrate prior to the application of a pretreatment coating composition.

BACKGROUND INFORMATION

In the automobile industry, vehicular components, such as vehicular body panels, are often stamped from sheets of metal and shipped to facilities around the world in order to be assembled into an automotive vehicle. Traditionally, these components are not coated with any type of protective coating composition and are, therefore, susceptible to environmental conditions. Accordingly, these panels often exhibit corrosion in the form of black spots.

SUMMARY OF THE INVENTION

The present invention is directed to a coating composition comprising (i) a corrosion inhibitor and (ii) calcium phosphate. The present invention is also directed to a substrate that comprises a coating system that comprises such a coating composition.

The present invention is also directed to a coating composition comprising (i) a corrosion inhibitor and the (ii) reaction product of a calcium compound with an acid compound. The present invention is also directed to a substrate that comprises a coating system that comprises such a coating composition.

The present invention is also directed to a method of coating a substrate comprising: (a) applying a first coating composition onto at least a portion of the substrate, said first coating composition comprising (i) a corrosion inhibitor and (ii) the reaction product of a calcium compound with an acid compound; (b) dehydrating at least a portion of the first coating composition thereby forming a first coating layer; (c) removing at least a portion of the first coating layer to expose at least a portion of the substrate; (d) optionally, rinsing the substrate exposed in step (c) and/or the first coating layer; and (e) applying a second coating composition onto at least a portion of the first coating layer or applying a second coating onto at least a portion of the substrate wherein the first coating layer has been removed.

The present invention is also directed to a method of coating a substrate comprising: (a) applying a first coating composition onto at least a portion of the substrate, said first coating composition comprising (i) a corrosion inhibitor and (ii) calcium phosphate; (b) dehydrating at least a portion of the first coating composition thereby forming a first coating layer; (c) optionally, rinsing the substrate; and (d) applying a second coating composition onto at least a portion of the first coating layer or applying a second coating onto at least a portion of the substrate wherein the first coating layer has been removed.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Plural encompasses singular and vice versa. For example, although reference is made herein to "an" organic solvent, "a" monomer comprising at least two ethylenically unsaturated double bonds, "a" monomer comprising a carbon atom that is connected to four moieties wherein one of the moieties comprises a hydrogen atom and the remainder of the moieties comprises an alkyl group, a combination (a plurality) of these components can be used in the present invention.

As used herein, "plurality" means two or more.

As used herein, "includes" and like terms means "including without limitation."

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Coating Composition

The present invention is directed to a coating composition that can be applied onto at least a portion of a substrate. As will be discussed in greater detail below, the coating composition disclosed herein is applied onto the substrate prior to application of a pretreatment coating composition (i.e., conversion coating composition) onto the substrate.

In certain embodiments, the coating composition described herein comprises: (i) a corrosion inhibitor and (ii) calcium phosphate. Suitable corrosion inhibitors that may be used in the present invention include, without limitation, compounds comprising zinc, aluminum, magnesium, yttrium, bismuth, lead, or combinations thereof. For example, the corrosion inhibitors may comprise zinc phosphate, aluminum phosphate, magnesium phosphate, yttrium phosphate, bismuth phosphate, lead phosphate, lead phosphatezinc-5-nitroisophthalate, molybdenum phosphate, zinc-5-nitroisophthalate, yttrium phosphate, bismuth phosphate, lead phosphate, organic-modified zinc aluminum molybdenum phosphate hydrate, or combinations thereof. Other suitable corrosion inhibitors also include those described in U.S. Pat. App. Pub. No. 2004/0255819, paragraphs [0011] to [0051], the cited portion of which being incorporated herein by reference, benzotriazole and its derivatives, or combinations of any of the foregoing.

In other embodiments, the coating composition described herein comprises (i) a corrosion inhibitor and the (ii) reaction product of a calcium compound with an acid compound. Suitable calcium compounds that may be used in the present invention include calcium nitrate, calcium phosphate, calcium gluconate, calcium malate, calcium acetate, calcium thioglycolate, calcium formate, calcium xylenite, or combinations thereof. Suitable acid compounds that may be used in the present invention include, without limitation, phosphoric acid, fluorotitanic acid, fluorosilicic acid, or combinations thereof. In certain embodiments, the coating composition does not comprise fluorotitanic acid.

In some embodiments, the coating composition consists essentially of (i) a corrosion inhibitor and (ii) calcium phosphate or, alternatively, (i) a corrosion inhibitor and the (ii) reaction product of a calcium compound with an acid compound.

Method of Coating a Substrate

As stated above, the coating composition disclosed herein is applied onto at least a portion of a substrate prior to application of a pretreatment coating composition onto the substrate. The method comprises of various steps that will be described in great detail below.

In step (a), the first coating composition, which is described above, is deposited onto at least a portion of the substrate. As stated above, the first coating composition can comprise: (i) a corrosion inhibitor and (ii) the reaction product of a calcium compound with an acid compound or, alternatively, (i) a corrosion inhibitor and (ii) calcium phosphate. Application of the first coating composition may be accomplished using various techniques that are known in the art. For example, the first coating composition may be applied onto at least a portion of the substrate using spray and/or immersion techniques.

In step (b), at least a portion of the first coating composition is subjected to a dehydrating step in order to form a first coating layer. The dehydrating step described in the present invention can be accomplished using various techniques known in the art such as thermal heating. For instance, the dehydrating step can be accomplished by introducing the substrate onto which the first coating composition is deposited in a thermal oven, which can be set at a temperature ranging from 93.33° C. (200° F.) to 215.56° C. (420° F.), for a period of time ranging from 10 seconds to 5 minutes in order to form the first coating layer. Alternatively, infrared radiation may be used to accomplish the dehydrating step by exposing the substrate to an infrared heat emitter, such as an infrared heat lamp, for a time period ranging from 10 seconds to 5 minutes.

In step (c), at least a portion of the first coating layer may be rinsed prior to application of a pretreatment coating composition in step (d). A suitable material that may be used to rinse the first coating layer would include water, such as deionized water. The spray and/or immersion techniques described above may be used to apply the rinsing solution to the first coating layer in this step. Alternatively, in certain embodiments, step (c) involves the removal of at least a portion of the first coating layer from at least a portion of the substrate thereby exposing the substrate. In some embodiments, removal of the first coating layer can be accomplished through the use of chemical cleaner compositions, which are known in the art. For example, an alkaline cleaner, such as CK 166 (commercially available from PPG Industries, Inc.) or PARCOLENE 338 (commercially available from Henkel Specialty Chemicals) can be used as the chemical cleaner composition. In other embodiments, mechanical means, such as brushing or grit blasting, may be utilized alone or in combination with the chemical cleaners described above in order to remove the first coating layer as is described in the present invention.

In step (d), a second coating composition is deposited onto at least a portion of the first coating composition. Alternatively, if step (c) involved the removal of at least a portion of the first coating layer as described in the preceding paragraph, then, in this particular embodiment, step (d) would comprise the step of rinsing at least a portion of the substrate that was exposed after step (c) and/or at least a portion of the first coating layer that remained after step (c) using the rinsing solutions and application methods described in the preceding paragraph. Step (e) would then comprise the deposition of the pretreatment coating composition described in this paragraph to the substrate and/or the first coating layer of step (d) of this particular embodiment. In certain embodiments, the second coating composition comprises a pretreatment coating composition (conversion coating composition). Suitable pretreatment coating compositions that may be used in this step include, without limitation, iron and/or zinc phosphate compositions, such as CHEMFOS 158 (available from PPG Industries, Inc.) or those described in U.S. Pat. Nos. 4,793,867 and 5,588,989, or a zirconium containing composition, such as described in U.S. patent application Ser. Nos. 11/610,073, 11/863,919 and 11/833,525, ZIRCOBOND (available from PPG Industries Inc.), or combinations thereof. Other suitable pretreatment coating compositions also include CHEMFOS 700 (available from PPG Industries, Inc.) and BONDERITE (available from Henkel Corporation). In other embodiments, the second coating composition comprises an electrodepositable coating composition or a primer-surfacer coating composition such as those described in greater detail below.

In some embodiments, the method consists essentially of steps (a) through (d) or, alternatively, (a) thorough (e) as discussed in the preceding paragraphs.

Coating System

The coating composition described herein may be applied as part of a coating system that can be deposited onto a number of different substrates. The coating system typically comprises a number of coating layers. A coating layer is typically formed when a coating composition that is deposited onto the substrate is substantially cured or dried by methods known in the art (e.g., by thermal heating).

Suitable substrates that can be coated with the electrodepositable coating composition described herein include, without limitation, metal substrates, metal alloy substrates, and/or substrates that have been metalized, such as nickel plated plastic. In some embodiments, the metal or metal alloy can be aluminum and/or steel. For example, the steel substrate could be cold rolled steel, electrogalvanized steel, and hot dipped galvanized steel. Moreover, in some embodiments, the substrate may comprise a portion of a vehicle such as a vehicular body (e.g., without limitation, door, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks.

In certain embodiments, an electrodepositable coating composition, such as those described in U.S. patent application Ser. No. 11/835,600, may be applied onto at least a portion of the pretreatment coating composition described above after at least a portion of the pretreatment coating composition is rinsed with a rinsing solution, such as deionized. After the electrodepositable coating composition is cured, a primer-surfacer coating composition is applied onto at least a portion of the electrodepositable coating composition. The primer-surfacer coating composition is typically applied to the electrodepositable coating layer and cured prior to a subsequent coating composition being deposited over the primer-surfacer coating composition.

The primer-surfacer layer that is deposited from the primer-surfacer coating composition serves to enhance chip resistance of the coatings system as well as aid in the appearance of subsequently applied layers (e.g., color imparting coating composition and/or substantially clear coating composition). As used herein, "primer-surfacer" refers to a primer composition for use under a subsequently applied coating composition, and includes such materials as thermoplastic and/or crosslinking (e.g., thermosetting) film-forming resins generally known in the art of organic coating compositions. Suitable primers and primer-surfacer coating compositions include spray applied primers, as are known to those skilled in the art. Examples of suitable primers include several available from PPG Industries, Inc., Pittsburgh, Pa., as DPX-1791, DPX-1804, DSPX-1537, GPXH-5379, OPP-2645, PCV-70118, and 1177-225A. Another suitable primer-surfacer coating composition that can be utilized in the present invention is the primer-surfacer described in U.S. patent application Ser. No. 11/773,482.

It should be noted that in some embodiments, the primer-surfacer coating composition is not used in the coating system. Therefore, a color imparting coating composition can be deposited directly onto the cured electrodepositable coating composition.

In some embodiments, a color imparting coating composition (hereinafter, "basecoat") is deposited onto at least a portion of the primer surfacer coating layer (if present). Any basecoat coating composition known in the art may be used in the present invention. It should be noted that these basecoat coating compositions typically comprise a colorant.

In certain embodiments, a substantially clear coating composition (hereinafter, "clearcoat") is deposited onto at least a portion of the basecoat coating layer. As used herein, a "substantially clear" coating layer is substantially transparent and not opaque. In certain embodiments, the substantially clear coating composition can comprise a colorant but not in an amount such as to render the clear coating composition opaque (not substantially transparent) after it has been cured. Any clearcoat coating composition known in the art may be used in the present invention. For example, the clearcoat coating composition that is described in U.S. Pat. Nos. 5,989,642, 6,245,855, 6,387,519, and 7,005,472 can be used in the coating system. In certain embodiments, the substantially clear coating composition can also comprise a particle, such as a silica particle, that is dispersed in the clearcoat coating composition (such as at the surface of the clearcoat coating composition after curing).

One or more of the coating compositions described herein can comprise colorants and/or other optional materials, which are known in the art of formulated surface coatings. As used herein, the term "colorant" means any substance that imparts color and/or other opacity and/or other visual effect to the composition. The colorant can be added to the coating in any suitable form, such as discrete particles, dispersions, solutions and/or flakes (e.g., aluminum flakes). A single colorant or a mixture of two or more colorants can be used in the coating composition described herein.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348, filed Jun. 24, 2004, U.S. Provisional Application No. 60/482,167, filed Jun. 24, 2003, and U.S. patent application Ser. No. 11/337,062, filed Jan. 20, 2006.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating composition described herein. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Se. No. 10/892,919, filed Jul. 16, 2004.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

In addition to the materials described above, the coating composition can also comprise an organic solvent. Suitable organic solvents that can be used in the coating composition include any of those listed in the preceding paragraphs as well as butyl acetate, xylene, methyl ethyl ketone, or combinations thereof.

It will be further appreciated that one or more of the coating compositions that form the various coating layers described herein can be either "one component" ("1K"), "two component" ("2K"), or even multi-component compositions. A 1K composition will be understood as referring to a composition wherein all of the coating components are maintained in the same container after manufacture, during storage, etc. A 2K composition or multi-component composition will be understood as referring to a composition wherein various components are maintained separately until just prior to application. A 1K or 2K coating composition can be applied to a substrate and cured by any conventional means, such as by heating, forced air, and the like.

The coating compositions that form the various coating layers described herein can be deposited or applied onto the substrate using any technique that is known in the art. For example, the coating compositions can be applied to the substrate by any of a variety of methods including, without limitation, spraying, brushing, dipping, and/or roll coating, among other methods. When a plurality of coating compositions are applied onto a substrate, it should be noted that one coating composition may be applied onto at least a portion of an underlying coating composition either after the underlying coating composition has been cured or prior to the underlying coating composition being cured. If the coating composition is applied onto an underlying coating composition that has not been cured, both coating compositions may be cured simultaneously.

The coating compositions may be cured using any technique known in the art such as, without limitation, thermal energy, infrared, ionizing or actinic radiation, or by any combination thereof. In certain embodiments, the curing operation can be carried out at temperatures $\geq 10°$ C. In other embodiments, the curing operation can be carried out at temperature $\leq 246°$ C. In certain embodiments, the curing operation can be carried out at temperatures ranging between any combination of values, which were recited in the preceding sentences, inclusive of the recited values. For example, the curing operation can be carried out at temperatures ranging from 120° C.-150° C. It should be noted, however, that lower or higher temperatures may be used as necessary to activate the curing mechanisms.

In certain embodiments, one or more of the coating compositions described herein is a low temperature, moisture curable coating compositions. As used herein, the term "low temperature, moisture curable" refers to coating compositions that, following application to a substrate, are capable of curing in the presence of ambient air, the air having a relative humidity of 10% to 100%, such as 25% to 80%, and a temperature in the range of −10° C. to 120° C., such as 5° C. to 80° C., in some cases 10° C. to 60° C. and, in yet other cases, 15° C. to 40° C.

The dry film thickness of the coating layers described herein can range from 0.1 micron to 500 microns. In other embodiments, the dry film thickness can be $\leq 125$ microns, such as $\leq 80$ microns. For example, the dry film thickness can range from 15 microns to 60 microns.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

TABLE 1

| Component | | Formula Weight (g) | | | |
|---|---|---|---|---|---|
| No. | Description | Coating 1 | Coating 2 | Coating 3 | Coating 4 |
| 1 | Deionized water | 88.68 | 87.4 | 88.1 | 82.70 |
| 2 | 25% Fluorosilicic acid | 2.22 | 1.8 | — | 2.10 |
| 3 | Calcium Nitrate | — | — | — | 2.90 |
|   | Calcium phosphate | 4.43 | 4.43 | 4.30 | — |
| 4 | 85% Phosphoric acid | — | 3.70 | 2.10 | 5.50 |
| 5 | 60% Fluorotitanic acid | 3.90 | — | 3.80 | 3.60 |
| 6 | Ferric nitrate | 0.53 | 0.30 | 1.51 | 0.50 |
| 7 | HEUCOPHOS ZAMPLUS[1] | — | — | — | 2.00 |
| 8 | Sodium Gluconate | 0.23 | — | 0.20 | 0.50 |
| 9 | Xanthan Gum | — | — | — | 0.20 |
|   | Total | 100.00 | 100.0 | 100.0 | 100.00 |

[1]Anticorrosion additive, received from HEUBACH GmbH, Germany.

Pre-phosphate coating compositions Examples 1 to 4 (below) were prepared from the materials listed in Table 1. Each coating was prepared by charging component 1 to 9 sequentially into a glass beaker under stirring. The components were added one at a time and stirred to be dissolved or mixed uniformly until the next component was added. The final coating products are clear to partly hazy solutions.

Stability Testing

The coating solutions were stored in polyethylene containers at room temperature overnight and the appearance was observed. The same samples were then allowed to sit at room temperature for several months and the clarity of the solutions was observed.

TABLE 2

|  | Example 1 | Example 2 | Example 3 | Example 4 |
| --- | --- | --- | --- | --- |
| Solution appearance - initial | Hazy Heavy precipitate | Clear Solution | Hazy Heavy precipitate | Clear solution |
| Solution appearance - after 3 months | Hazy Heavy precipitate | Clear Solution | Hazy Heavy precipitate | Clear solution |

Corrosion Resistance Testing

Hot-dipped galvanized steel panels (0.8 mm, Z100 DC04) from ThyssenKrupps Steel were cleaned in an alkaline cleaner, Parcolene® 338 (3.0% solution in deionized water), via a 12 second spray at 71.11° C. (160° F.), then rinsed with deionized water spray at room temperature, and dried with hot air guns. The phosphate solutions were applied to cleaned panels with a lab rollcoater, fitted with rolls made from ethylene propylene diene monomer rubber with durometer hardness of 30. Coatings were roll-applied by direct rollcoat application at 200 feet per minute roll surface speed. The coated panels were then dried in a 210° C. (410° F.) oven for 2 minutes.

Corrosion resistance performance coated panels was evaluated using a black spot corrosion test. Pretreated galvanized steel panels were held in a closed container, in which saturated solution of potassium chloride was partially charged in the bottom. The humidity in the container is maintained at 85%. In order to accelerate the corrosion and seed the formation of black spot, sodium chloride crystals were sprinkled on the panels. The appearance of the panels was monitored daily over the course of 8 days. As shown in table 3, bare hot-dipped galvanized steel and panels coated with coatings 1 to 3 only passed 2 days without black spot formation, while panel coated with coating 4 passed 7 days testing without developing black spot corrosion.

TABLE 3

Black Spot Corrosion Resistance Testing Results

|  | Bare hot-dipped galvanized steel | Example 1 | Example 2 | Example 3 | Example 4 |
| --- | --- | --- | --- | --- | --- |
| Appearance - day 2 | No black spot staining | No black spot staining | No black spot staining | No black spot staining | No black spot staining |
| Appearance - day 3 | Heavy black spot staining | Heavy black spot staining | Heavy black spot staining | Heavy black spot staining | No black spot staining |

TABLE 3-continued

Black Spot Corrosion Resistance Testing Results

|  | Bare hot-dipped galvanized steel | Example 1 | Example 2 | Example 3 | Example 4 |
| --- | --- | --- | --- | --- | --- |
| Appearance - day 5 | n/a | n/a | n/a | n/a | No black spot staining |
| Appearance - day 6 | n/a | n/a | n/a | n/a | No black spot staining |
| Appearance - day 8 | n/a | n/a | n/a | n/a | Slight black spot staining |

What is claimed is:

1. A method of coating a substrate comprising:
   (a) applying a first coating composition onto at least a portion of the substrate wherein said first coating composition comprises: (i) a corrosion inhibitor comprising organic-modified zinc aluminum molybdenum phosphate hydrate and (ii) the reaction product of a calcium compound with an acid compound comprising a fluoroacid;
   (b) dehydrating at least a portion of the first coating composition to form a first coating layer;
   (c) removing at least a portion of the first coating layer to expose a portion of the substrate;
   (d) optionally, rinsing at least a portion of the substrate exposed in step (c) and/or the first coating layer; and
   (e) applying a second coating composition onto at least a portion of the exposed substrate or at least a portion of the first coating layer.

2. The method of claim 1, wherein the calcium compound comprises calcium nitrate, calcium phosphate, or a combination thereof.

3. The method of claim 1, wherein the fluoroacid comprises fluorotitanic acid, fluorosilicic acid, or a combination thereof.

4. The method of claim 1, wherein the second coating comprises a pretreatment coating composition.

5. The method of claim 1, wherein the second coating comprises an electrodepositable coating composition or a primer-surfacer coating composition.

6. The method of claim 1, wherein the corrosion inhibitor further comprises a second phosphate, benzotriazole, a derivative of benzotriazole, or a combination thereof.

7. The method of claim 6, wherein the second phosphate comprises zinc phosphate, aluminum phosphate, magnesium phosphate, yttrium phosphate, bismuth phosphate, lead phosphate, molybdenum phosphate, or a combination thereof.

8. The method of claim 1, wherein the acid compound further comprises phosphoric acid.

9. A method of coating a substrate comprising:
   (a) applying a first coating composition onto at least a portion of the substrate wherein said first coating composition comprises: (i) a corrosion inhibitor comprising organic-modified zinc aluminum molybdenum phosphate hydrate and (ii) the reaction product of a calcium compound with an acid compound comprising a fluoroacid;
   (b) dehydrating at least a portion of the first coating composition thereby forming a first coating layer;
   (c) optionally, rinsing the substrate; and
   (d) applying a second coating composition onto at least a portion of the first coating layer.

10. The method of claim 9, wherein the calcium compound comprises calcium nitrate, calcium phosphate, or a combination thereof.

11. The method of claim 9, wherein the acid compound comprises fluorotitanic acid, fluorosilicic acid, or a combination thereof.

12. The method of claim 9, wherein the second coating composition comprises a pre-treatment coating composition, an electrodepositable coating composition, or a primer-surfacer coating composition.

13. The method of claim 9, wherein the corrosion inhibitor further comprises a second phosphate, benzotriazole, a derivative of benzotriazole, or a combination thereof.

14. The method of claim 13, wherein the second phosphate comprises zinc phosphate, aluminum phosphate, magnesium phosphate, yttrium phosphate, bismuth phosphate, lead phosphate, molybdenum phosphate, or a combination thereof.

15. The method of claim 9, wherein the acid compound further comprises phosphoric acid.

* * * * *